F. W. CALDEN.
CAMERA.
APPLICATION FILED OCT. 6, 1914.
1,134,725.
Patented Apr. 6, 1915.
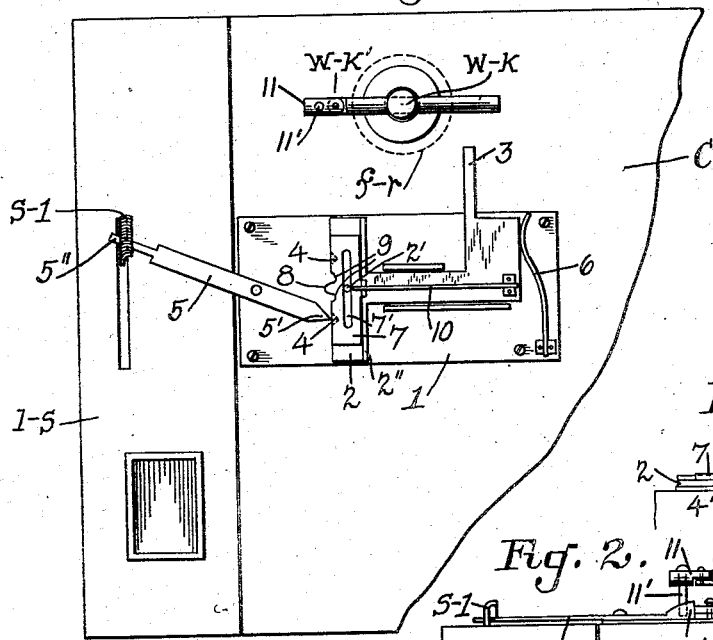
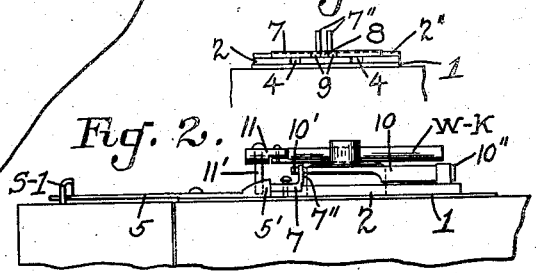
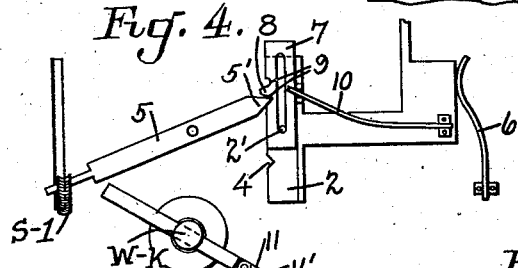
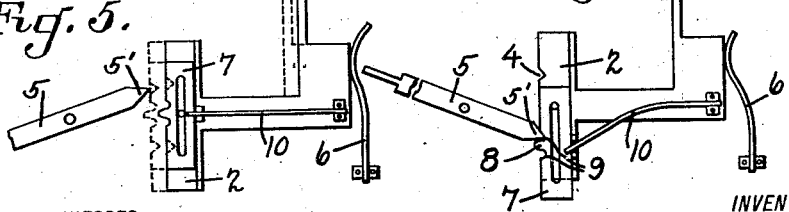
WITNESSES:
Ernest L. Gale Jr.
James G. Bethell.
INVENTOR
Fred W. Calden
BY L H Campbell
ATTORNEY

UNITED STATES PATENT OFFICE.

FRED W. CALDEN, OF BURLINGTON, VERMONT.

CAMERA.

1,134,725.  Specification of Letters Patent. Patented Apr. 6, 1915.

Application filed October 6, 1914. Serial No. 865,289.

*To all whom it may concern:*

Be it known that I, FRED W. CALDEN, a citizen of the United States, residing at Burlington, in the county of Chittenden and State of Vermont, have invented a new and useful Improvement in Cameras, of which the following is a specification.

My invention has for its object a novel locking attachment for a box type of camera; and it consists of the construction, arrangement and combination of parts and devices hereinafter described and claimed, and shown in the accompanying drawings, in which—

Figure 1 is a plan view of a portion of a box type of camera with my locking mechanism, with the shutter-lever unlocked; Fig. 2 is a side elevational view of Fig. 1; Fig. 3 is an end elevational view of certain parts of the locking mechanism; Figs. 4 and 6 are plan views of the locking mechanism with the shutter-lever locked; Fig. 5 is a plan view, in full lines, of the locking mechanism when moved by the winding key.

The invention applies more particularly to box cameras, in which film-rolls are used.

Heretofore amateur users of the camera have experienced no little loss and disappointment in the use of the camera in consequence of forgetfulness to rotate properly the film-holder and film-roll after making one exposure to take a picture, in order to bring another portion of the film into proper position for exposure to take a subsequent picture.

As is known, the shutter of the camera is always set and is operated by pushing the shutter-lever alternately to the right or left. To take a picture, the shutter-lever is pressed to one side to cause the shutter to open and expose the film. When it is desired to take a subsequent picture, the winding reel should be turned by the winding key to turn off enough of the film of the film roll for that picture, thereby turning a new film into position for the picture. The aforegoing operation is repeated for each picture. The film roll is divided into exposures of suitable and the same size, and numbered consecutively. In the back of the camera is a little red window, and by watching in which, the numerals can be read as they are brought to view therethrough by the turning of the film reel to bring a new exposure into the proper position to take a picture. By operating the shutter by its lever the shutter is opened and the picture taken, as has been explained. At some time before taking the next picture, the winding key should be turned to bring a new film into position. But, as has been written, above, it is sometimes the case that through forgetfulness, the key is not turned and consequently a new film is not brought into position, with the result that the subsequent picture is taken upon the one already taken, or in brief, a double exposure, as it is called, is had, and of course, both pictures ruined. What is even more annoying than loss of film, is the loss of the pictures, since it is often the case that the fact of double exposure is not known until the development of the pictures. As is stated, above, the shutter is operated by a lever by pushing the lever alternately to the right or left, and I have taken advantage of the arrangement to provide a locking mechanism which engages the lever and locks it against being pushed over from one side to the other unless and until a new film is ready, in proper position for the taking of the picture. I have further adapted and arranged the locking mechanism to be unlocked by the turning of the winding key to bring a new film into position. Thus, if the shutter-lever be pushed to take a picture, but is found to be locked, a double exposure is prevented, and the operator is reminded that a new film should be brought into position. By turning the winding key the new film is brought into position and the locking mechanism unlocked to permit the shutter-lever to be pushed to operate the shutter to take the picture.

I will now proceed to describe my invention. It is shown in the drawing applied to a box-type of camera, having the usual case or box portion, C, which contains the film reel, $f—r$, the small window or sight opening in the back of the box (not shown), the winding-key, $w—k$, the lens and shutter-holding portion, $l—s$, and the shutter-lever, $s—l$, all of which are usual to the camera and the mode of operation of which I have already mentioned.

I securely fasten a base plate, 1, to the box on the same side that the winding-key and shutter-lever are. The base plate is for convenience and workmanship, and can be omitted, as will appear later on from the disclosure. On the base plate, I place another plate, 2, which I may term, a lock-plate, adapted to be reciprocated on the base plate in a direction toward and from the shutter lever s—l. It is plain if and when the base plate is omitted that the plate 2 will be placed on the box case. I have shown the plate 2 of substantially T-shape in flat outline, with a projection or extension, 3, adapted to extend into the path of the circle described by the end of the cross bar of the winding-key, for a purpose described later on. It is obvious that the outline shape of the plate 2 is not of consequence, provided that its edge next to the shutter-lever, s—l, be substantially straight, and that some part of the plate shall be engageable by the bar of the winding-key, w—k. There are two notches, 4, in the edge of the plate 2 next to the shutter-lever, s—l. There is a lever, 5, pivoted between the plate 2 and the shutter-lever, s—l, which I may term a locking lever; one end 5′ of the lever 5 is adapted to be engaged in the notches 4, in the plate 2 when the latter is in a locking position, by the action of a spring 6, which tends to move the plate 2 toward the lever 5. The other end 5″ of the lever 5 is in engagement with the shutter-lever, s—l. Upon the plate, 2, I place a guard plate 7, having a nose, 8, midway of the length of its front edge, and projecting therefrom, and having notches, 9, in its front edge, at the base of the nose. The notches 4 and 9 are adapted to register with each other when the shutter-lever is locked, the end 5′ of the locking lever being in engagement with two of the notches, 4 and 9, as will be seen upon reference to Figs. 4 and 6; but the notches 4 and 9 do not register with each other when the locking lever is not in engagement with them, as will be seen upon reference to Figs. 1 and 5. The straight portions of the front edge of the plate 7 serve to hold the end 5′ of the locking lever out of engagement with the notches 4 and 9, as will be seen upon reference to Fig. 1. The nose 8 serves as a point of engagement to enable the end 5′ of the locking lever 5 to move the plate 7 across the front edge of the plate 2, against the tension of a spring, 10, which tends to hold the guard plate 7 midway between the ends of the plate 2. The guard plate 7 is guided in its reciprocation across the plate 2 by means of a pin 2′, in the plate 2, extended in a slot 7′ in the guard plate 7, and a flange 2″ raised from the edge of the plate 2. One end, 10′, of the spring, 10, is free between two posts 7″, upstanding from the plate 7; the other end, 10″ of the spring 10 is fast to the plate 2. Loosely jointed to one end w—k′, of the cross-bar of the winding-key, w—k, is an extension, 11, dropping from which is a post, 11′, adapted to strike the extension 3 of the plate, 2, upon the turning of the key, and if and when the joint is held stiff, to move the plate 2 in a direction from the shutter-lever, s—l, and lever 5, and to free the end 5′ of the lever 5 from the notches 4 and 9, as is shown in Fig. 1. When the projection 11′ has moved the plate 2 far enough to allow the projection, 11′, and the extension 3 to escape from engagement with each other, the spring 6 will return the plate 2 toward the lever, 5. There is in the camera box, a reel, upon which is to be wound the film with the pictures on it from the roll of film. At the beginning, the reel is empty; as the film is wound on the reel, from the spool, the diameter of the reel and its contents becomes larger. As has been explained, the winding key is used to turn off a new film and is also used to move the plate 2 from engagement with the lever 5, to permit the shutter lever s—l to be pushed to one side to operate the shutter. It is evident that the reel and winding-key are turned the same distance each time for the key to strike and move the plate 2, but as the principal object in turning the winding-key is to bring a new film to proper position and as the diameter of the reel increases with each turn of the key, the distance the key is turned each time grows less and less, the consequence is that when a new film is in proper position, the extension 11 of the key may have had to pass by the extension, 3, of the plate, 2, thereby prematurely releasing the lever 5, whereas the plan is that the shutter-lever shall be locked until and unless a new film is in proper position for a picture to be taken. To provide against the premature unlocking of the shutter lever, the extension 11 is flexibly joined to the key, so that the post 11′ may pass by the plate 2 without moving the same, but that when the operator sees in the sight window that the new film is about to be brought to proper position, he will hold stiff with his hand the joint of the extension 11, so that the post 11′ will move the plate 2; which is indicated by means of full and dotted lines in Fig. 5; the dotted lines in this figure indicating the disengagement of the plate 2 from the locking lever 5, by the plate 7 and the unoperative position of the post 11′.

I will now describe the operation of my locking attachment.

Assume that a picture has been taken, and the shutter-lever, s—l, is locked, say for example, as in the positions shown in Figs. 4 and 6; the shutter-lever can not be pushed to one side to operate the shutter, and, therefore, another or a double exposure of the picture taken can not be had. Upon attempting to push the shutter-lever to one side to take another picture, the operator is reminded by the shutter-lever being locked that a new film has not been brought to the proper position, whereupon, he proceeds to turn the winding key to bring a new film into position, in the meanwhile watching in the little red window for the numeral indicating the new film. If the new film does not appear at the instant the post 11' strikes the extension 3, the flexible joint will allow the post to pass by the extension 3 without moving the plate 2, and the shutter-lever will remain locked. Upon observing that the new film is about to be brought to the proper position, the operator will hold the joint stiff of the post 11' and allow the key to move the plate 2 out of engagement with the locking lever 5, whereat both the new film will be in the proper position and the shutter lever will be unlocked, ready to be pushed to one side to operate the shutter. If the operator observes that the key will not be in a position to move the plate 2 to unlock the shutter-lever, when the new film shall be in the proper position, the operator can hold the post stiff on an earlier turn of the key to unlock the lever 5, or when the new film is in proper position he can move the plate 2 with his hand to unlock the shutter-lever. It will be observed in Fig. 4 that the end 5' of the locking lever 5 is in a locked position on the near side of the nose 8 and in two of the notches 4 and 9, in the plates 2 and 7, respectively, and in Fig. 6 that the end 5' of the lever 5 is on the far side of the nose 8. Upon the plates 2 and 7 being moved from engagement with the lever 5, the spring 10 moves the plate 7 to its midway position and the nose 8 past or to the other side of the lever 5; and when the two plates are partially restored by the action of the spring 10 to the position as they were, as with respect to their movement to and from the lever, the straight portion of the guard plate 7 comes into contact with the end of the lever and keeps the plate 2 from being wholly returned to its initial position, thereby keeping a notch 4 from engaging the end of the lever 5, thereby preventing the lever 5 from becoming locked again, and thereby preventing the shutter lever from becoming locked again before the latter has been completely operated. It will thus be seen in the mode of operation of the device that the straight portion of the plate 7 serves as a guard to keep one of the notches 4 in the plate 2 from being prematurely engaged by the lever 5, or in another aspect preventing the locking mechanism from being operated to unlock the shutter lever and immediately thereafter to be locked again before the shutter lever has been operated.

While the device and its mode of operation have been given some length of description, the invention is simple, the parts simple of construction and the combination inexpensive of manufacture, and easy and convenient to manipulate, and will save its cost many times over.

What I desire to claim as my invention is:—

1. An apparatus to prevent double exposure with a photographic camera, comprising means to lock the shutter-lever in its extreme position of travel to snap the shutter, including a member, and another member associated therewith to maintain the shutter lever unlocked during its operation to snap the shutter, in combination with the winding-key of the camera, and a post operable thereby to unlock the shutter lever.

2. An apparatus to prevent double exposure with a photographic camera, comprising means to lock the shutter-lever against being operated in its extreme position of travel to snap the shutter in both directions, including a member, and another member associated therewith to maintain the shutter lever unlocked during its operation to snap the shutter, in combination with the winding key of the camera, and a post operable thereby to unlock the shutter lever.

3. An apparatus to prevent double exposure with a photographic camera, comprising means to lock the shutter lever in its extreme position of travel to snap the shutter, including a member, and another member associated therewith, to maintain the shutter lever unlocked during its operation to snap the shutter, in combination with the winding-key of the camera, and a post operable thereby to unlock the shutter lever, the said post being pivotally retractable.

4. An apparatus to prevent double exposure with a photographic camera, comprising means to lock the shutter-lever against being operated in its extreme position of travel to snap the shutter in both directions, including a member, and another member associated therewith to maintain the shutter lever unlocked during its operation to snap the shutter, in combination with the winding key of the camera, and a pivotally retractable post carried by the winding key and operable thereby to unlock the shutter lever.

5. An apparatus to prevent double exposure with a photographic camera, comprising means to lock the shutter-lever in its extreme position of travel to snap the shutter, including a member, and another member associated therewith, to maintain the shutter lever unlocked during its operation to snap the shutter.

6. An apparatus to prevent double exposure in a photographic camera, comprising means to lock the shutter lever in its extreme position of travel to snap the shutter, including a member to snap the shutter, and another member, associated with the said locking member, to prevent the latter from locking the shutter lever during the operation of the same to snap the shutter.

7. In an apparatus to prevent double exposure in a photographic camera, comprising a member adapted to lock the shutter, a guard member, automatically operable, and a lever, having one end adapted to engage the shutter lever, and the other end to be engaged by the said locking and guard members, to lock the shutter against being operated, and upon the unlocking of the shutter, to prevent the shutter-lever from being locked during its operation to snap the shutter.

8. An apparatus to prevent double exposure in a photographic camera, comprising a movable locking member, having notches in it, a connecting lever, pivoted between the said locking member and the shutter-lever, one end of the connecting lever engaged with the shutter-lever and the other end adaptable to be engaged in and disengaged from the said notches, upon the movement of the said locking member to and from the said other end of the connecting lever, a spring tending to hold the locking member to the connecting lever, and a guard member, having notches in it, and a nose, movable, by pushing the end of the connecting lever against the nose, to register the notches in the guard member with the notches in the locking member and engage the end of the connecting lever.

9. An apparatus to prevent double exposure in a photographic camera, comprising a movable locking member, having notches in it, a connecting lever, pivoted between the said locking member and the shutter-lever, one end of the connecting lever engaged with the shutter-lever and the other end adaptable to be engaged in and disengaged from the said notches, upon the movement of the said locking member to and from the said other end of the connecting lever, a spring tending to hold the locking member to the connecting lever, and a guard member, having notches in it, a nose, movable, by pushing the end of the connecting lever against the nose, to register the notches in the guard member with the notches in the locking member and engage the end of the connecting lever, and a spring tending to hold the guard plate in a position to hold the locking member disengaged from the end of the connecting lever.

10. An apparatus to prevent double exposure in a photographic camera, comprising a movable locking member, having notches in it, a connecting lever, pivoted between the said locking member and the shutter-lever, one end of the connecting lever engaged with the shutter-lever and the other end adaptable to be engaged in and disengaged from the said notches, upon the movement of the said locking member to and from the said other end of the connecting lever, a spring tending to hold the locking member to the connecting lever, and a guard member, having notches in it, a nose, movable, by pushing the end of the connecting lever against the nose, to register the notches in the guard member with the notches in the locking member and engage the end of the connecting lever, and a spring tending to hold the guard plate in a position to hold the locking member disengaged from the end of the connecting lever in combination with the winding key of the camera, and a retractable connection between the locking plate and key.

11. In a photographic camera, the combination of the shutter mechanism, film roll feeding mechanism, a locking mechanism to prevent movement of the shutter mechanism in its extreme position of travel to snap the shutter, adapted to be unlocked by the movement of the film-roll feeding mechanism; the shutter and film-roll feeding mechanisms being separately operable, and means automatically operable to maintain the locking and shutter mechanisms out of engagement with each other during the operation of the shutter mechanism.

12. In a photographic apparatus, the combination with a shutter-actuating device, a reciprocable member normally projecting into the path of the shutter-actuating mechanism, and means automatically to maintain the member when withdrawn from the path of the shutter-actuating mechanism in such position until the completion of the operation of the shutter-actuating mechanism.

13. In a photographic apparatus, the combination with a shutter-actuating device, a reciprocable member normally projecting into the path of the shutter-actuating mechanism to lock the same in its extreme position of travel to snap the shutter, and means automatically to maintain the member when withdrawn from the path of the shutter-actuating mechanism in such position until the completion of the operation of the shutter-actuating mechanism, and means automatically to release the member from its withdrawn position upon the completion of the operation of the shutter-actuating mechanism to allow the member to project again into the path of the shutter-actuating mechanism.

In testimony whereof I have signed my name to this specification in the presence of two subscribing witnesses.

FRED W. CALDEN.

Witnesses:
ARTHUR G. MANSUR,
GEORGE W. LA PIERRE.